(12) United States Patent
Frank

(10) Patent No.: US 7,668,681 B2
(45) Date of Patent: Feb. 23, 2010

(54) DISTRIBUTED SENSOR NETWORK WITH A COMMON PROCESSING PLATFORM FOR CBMRNE DEVICES AND NOVEL APPLICATIONS

(75) Inventor: David L. Frank, Boca Raton, FL (US)

(73) Assignee: Innovative American Technology, Inc., Boca Raton, FL (US)

( * ) Notice: Subject to any disclaimer, the term of this patent is extended or adjusted under 35 U.S.C. 154(b) by 232 days.

(21) Appl. No.: 11/852,835

(22) Filed: Sep. 10, 2007

(65) Prior Publication Data

US 2008/0125976 A1    May 29, 2008

Related U.S. Application Data

(63) Continuation-in-part of application No. 11/624,089, filed on Jan. 17, 2007, now Pat. No. 7,269,527.

(60) Provisional application No. 60/930,394, filed on May 16, 2007, provisional application No. 60/861,842, filed on Nov. 29, 2006.

(51) Int. Cl.
*G01M 19/00* (2006.01)
*G06F 17/40* (2006.01)

(52) U.S. Cl. ........................ 702/108; 702/187; 702/188; 702/189; 376/156; 356/75; 709/245

(58) Field of Classification Search .................... 702/19, 702/22–32, 60, 64, 76, 85, 104, 108, 122, 702/127, 183, 187–189; 340/286.01, 286.02; 709/245; 378/57; 73/866.1; 356/72, 73, 356/301

See application file for complete search history.

(56) References Cited

U.S. PATENT DOCUMENTS

| | | | |
|---|---|---|---|
| 6,847,731 B1 * | 1/2005 | Caulfield | .................... 382/159 |
| 6,850,176 B2 | 2/2005 | Laflaquiere et al. | |
| 7,034,677 B2 * | 4/2006 | Steinthal et al. | ........ 340/539.12 |
| 7,119,676 B1 * | 10/2006 | Silverstrim et al. | ......... 340/531 |

FOREIGN PATENT DOCUMENTS

| | | |
|---|---|---|
| JP | 09-080164 A | 3/1997 |
| KR | 10-2000-0037018 A | 7/2000 |
| KR | 10-2005-0108008 A | 11/2005 |

OTHER PUBLICATIONS

Search Report dated Dec. 18, 2008 for corresponding International Application No. PCT/US2007/085849.

* cited by examiner

*Primary Examiner*—Edward Raymond
*Assistant Examiner*—Phuong Huynh
(74) *Attorney, Agent, or Firm*—Jose Gutman; Fleit, Gibbons, Gutman, Bongini & Bianco P.L.

(57) ABSTRACT

An integrated chemical, biological, metals, radiation, nuclear, explosives sensor system I-CBMRNE deployed on a common platform supports chemical, biological, metals, radiation, nuclear, explosives (CBMRNE) surveillance systems. The common platform provides a database for collected sensor and video data, spectral analysis for sensor data, pattern recognition systems, data analysis and communications. An I-CBMRNE sensor system provides modular sensor interfaces to enable integration of any commercial off the shelf or proprietary sensor, and provides for ease of integration for new sensor technologies as they emerge. An I-CBMRNE sensor system provides critical functions for sensor support enabling accurate calibrated data to be presented for analysis.

6 Claims, 3 Drawing Sheets

DISTRIBUTED SENSOR NETWORK WITH A COMMON PROCESSING PLATFORM FOR CBMRNE DEVICES AND NOVEL APPLICATIONS

CROSS REFERENCE TO RELATED APPLICATIONS

This application is based on, and claims priority from co-pending U.S. Provisional Patent Application No. 60/930,394, filed on May 16, 2007, entitled "Gamma Energy Differentiation In Neutron Detection", and is also based on, and claims priority from co-pending U.S. Provisional Patent Application No. 60/861,842, filed on Nov. 29, 2006, entitled "Remote Sensor Network for Real-Time Analysis of Water Systems", and further is a Continuation-In-Part from U.S. patent application Ser. No. 11/624,089, filed on Jan. 17, 2007, now U.S. Pat. No. 7,269,527, issued on Sep. 11, 2007, entitled "System Integration Module For CBRNE Sensors"; the collective entire disclosures of which being hereby incorporated by reference.

BACKGROUND OF THE INVENTION

1. Field of the Invention

The present invention generally relates to sensor systems for identifying hazardous materials including chemical, biological, metals, radiation, nuclear, and explosive (CBMRNE) materials, and more particularly to an Integrated chemical, biological, metals, radiation, nuclear and explosives (I-CBMRNE) sensor system, where sensors are deployed as a distributed sensor network.

2. Description of Related Art

Current attempts at providing chemical, biological, metals, radiation, neutron, explosives (CBMRNE) detection do not enable a wide variety of sensors and do not provide an integrated solution to meet the needs of homeland security, military, and commercial customers. Currently, there are independent and proprietary systems deployed that are not capable of interconnecting and sharing information without using a separate application for integration. The addition of new sensors requirements are made more difficult and the need for separate analysis systems for each sensor type raises the overall cost of the system and lowers the effectiveness of the overall system. There are special needs for the support of CBMRNE sensors to be used in material identification such as automated calibration, automated gain control from analog sensors and calibration verification. Further, conventional implementations can be difficult to manage and have an impact on the ability to analyze and distribute critical information.

Therefore a need exists to overcome the problems with the prior art as discussed above.

SUMMARY OF THE INVENTION

According to an embodiment of the present invention, a system and method are provided for integrating chemical, biological, metals, radiation, nuclear and explosives (CBMRNE) sensors on a distributed network with an open interface and delivery of this data to a common platform for data collection, data processing, data analysis, spectral analysis, communications, manifest analysis, comprehensive event analysis and alarm processing. The integrated CBMRNE system enables a more effective monitoring and analysis, enables more rapid correlation of events, a more comprehensive analysis by utilizing data from all CBMRNE events enabling a rapid and effective response capability. For applications such as shipping ports, airports, subways, metropolitan areas and water supplies, where a variety of sensor types and sensor deployments are required, a common platform, sensor integration unit for sensor support and a distributed sensor network provides the flexibility and versatility needed to engineer an effective sensor application.

The use of a network edge device such as a sensor integration unit provides an open interface to sensors enabling rapid integration of a wide variety of sensor deployments. The sensor integration unit can be designed as a hardware module or a software module or a combination thereof. Special support functions are provided by the sensor integration unit such as automated calibration, automated gain control, and calibration verification. The need to provide highly accurate sensor data to a spectral analysis system that uses the sensor data to compare known spectral signatures is critical. In addition, the open architecture for integration of different sensors and new technologies, the Integrated CBMRNE system enables a wide variety of configurations to address security needs.

Various embodiments of the present invention provide a common analysis platform for the support of an Integrated chemical, biological, metals, radiation, nuclear and explosives (I-CBMRNE) sensor system, where the sensors are deployed as a distributed sensor network, a sensor integration unit provides sensor support systems and a common platform provides a database for collected sensor data, the spectral analysis of the sensor data, pattern recognition systems, result analysis and communications. The I-CBMRNE system, according to the various embodiments, provides a network edge device that enables integration of a wide variety of sensors enabling a comprehensive and fully integrated CBMRNE system. The ability to share information across an integrated CBMRNE system with a distributed architecture allows the flexibility and comprehensive data required for an effective response. A common data analysis, spectral analysis and reporting system with an open architecture enables the integration of a wide variety of sensors and new technologies for detection, identification, location and tracking of targeted materials, personnel and objects. A flexible sensor interface system with comprehensive support capabilities for the sensors and one that enables the integration of commercial off the shelf sensors and proprietary sensors systems are important to allow the best sensor systems to be integrated in to the I-CBMRNE system.

Example applications for an I-CBMRNE system architecture include, but are not limited to, the following.

1. Radiation Verification Systems deployed on a spreader bar of a gantry crane and other container movement equipment using spectral analysis for isotope identification, as described in U.S. Pat. No. 7,142,109, entitled "Container Verification System For Non-Invasive Detection Of Contents", and U.S. Pat. No. 7,005,982, entitled "Carrier Security System", the entire collective disclosure being hereby incorporated by reference herein.

2. Real-time water analysis systems (such as described in Provisional Patent Application No. 60/861,842, entitled "Real-Time Water Analysis", the entire disclosure being hereby incorporated by reference) can be deployed across metropolitan areas for the early detection, identification and quantification of metals through laser induced breakdown spectroscopy, chemicals contaminants through gas chromatography, mass spectrometry, calorimetric spectroscopy, biological contaminants through calorimetric spectroscopy, and radiation verification based on spectral analysis.

3. Chemical, Biological and Explosives detection and identification systems based on calorimetric spectrometry and Radiation, Nuclear detection identification systems based on spectral analysis deployed in subways, airports and other public areas for early detection and identification of contaminants.

Further integration of video and intruder alarm systems could be used to enhance the I-CBMRNE system. Remote and local video surveillance could be used as supporting data for an event and further investigation of the event. Video data could be applied to the common platform for use in pattern recognition. The video data and intruder alarm data could be cross-correlated to the CBMRNE event.

DETAILED DESCRIPTION

Figure 1:
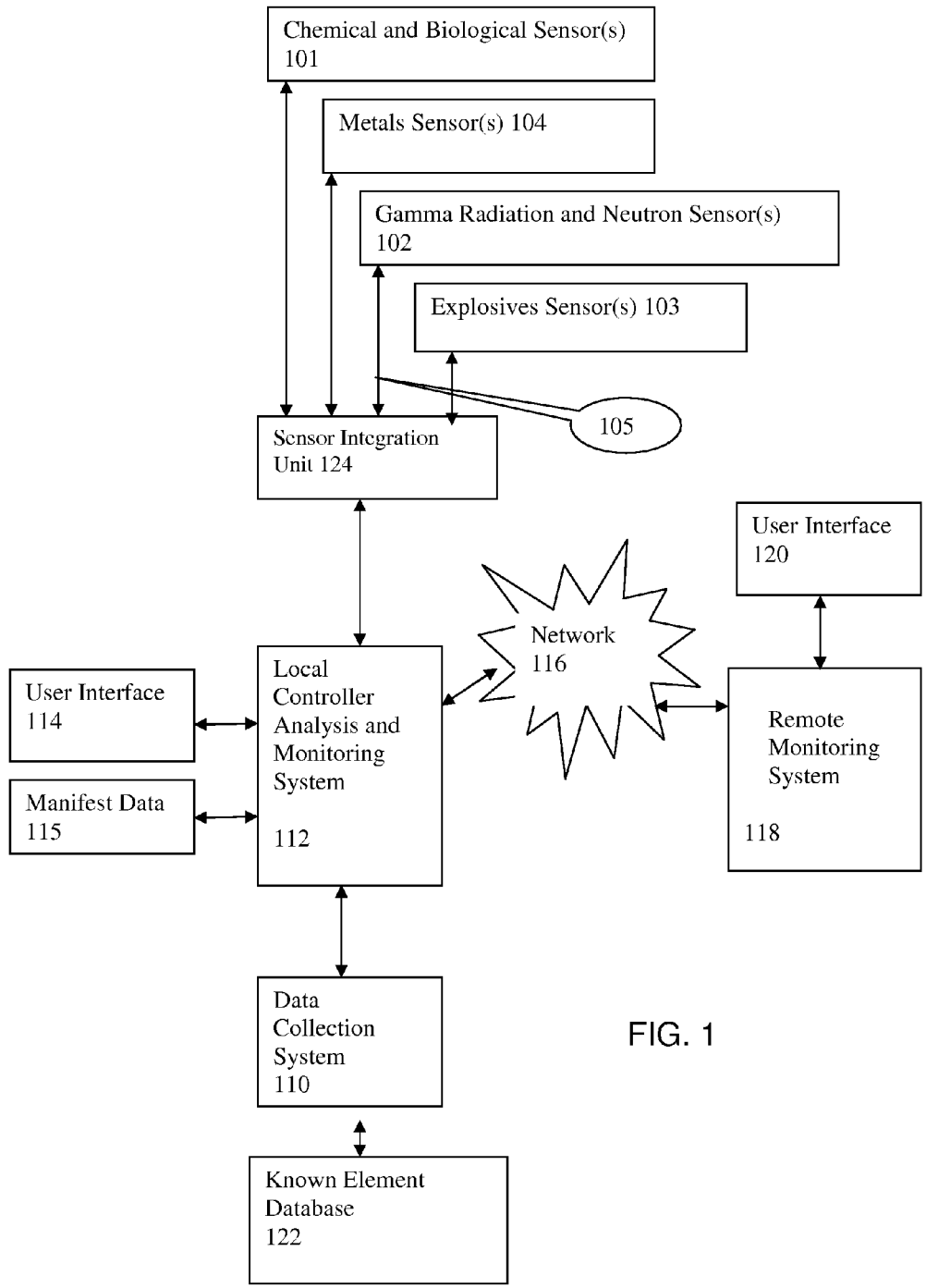
FIG. 1 is a simplified schematic illustrating an I-CBMRNE common platform, data collection and analysis system, according to an embodiment of the invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "computer program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by providing a common platform for the data collection, data analysis, spectral analysis, alarm data, communications and user interfaces for chemical, biological, radiation, nuclear, explosives sensors and video data.

The Common Platform provides data collection and preparation for spectral analysis of the sensor and for detection and identification of the chemical, biological, radiation or explosives materials. Each of the I-CBMRNE sensors provides spectral data as an output. The spectral data is prepared for the analysis software for each of the detector types. A database of known chemical, biological, radiation and explosives materials is maintained at the common platform to enable the pattern recognition system to identify the known CBMRNE materials.

The common platform is comprised of individual servers or pairs of servers for redundancy. In the redundant configuration, each pair of servers monitor each other for failure. In the case of a server failure, the redundant partner connects to the sensors assigned to the failed server and assumes control of those sensors.

The common platform servers provide data collection and data preparation for the pattern recognition software. Multiple pattern recognition software systems are utilized to provide multi-confirmation for detection and identification. These pattern recognition systems can be trained to identify a wide variety of signatures including chemical, biological, radiation and explosives signatures based on the I-CBMRNE system sensor data. To provide for an efficient configuration, the common platform is divided into multiple server groups. Each server group is trained for a specific sensor set: 1) Chemical and Biological sensors, 2) radiation sensors, 3) metal sensors, and 4) explosives sensors.

The common platform server groups are assigned sensors from across the distributed sensor network. The servers connect to the assigned sensors and receive the sensor data for analysis. Each server group has an assigned database of known materials for support of the analysis and identification.

The invention provides for a distributed sensor network connecting the wide variety of CBMRNE sensors in an open network architecture to enable the addition of new sensor types. If the sensor data is provided as an analog signal, it is converted to a digital signal to enable connectivity across a digital data network. Digital sensors with standard communications capabilities are connected directly to the network. A network edge device is provided for the sensor interface where needed.

For analog chemical sensors, the analog signals are converted to digital data. Once the chemical sensor data is digitized, the data is passed to the communications module for digital transmission to the common platform.

For analog biological sensors, the analog signals are converted to digital data. Once the biological sensor data is digitized, the data is passed to the communications module for digital transmission to the common platform.

For analog gamma sensors, the analog signals are converted to digital data. Once the analog sensor data is digitized, the data is passed to the communications module for digital transmission to the common platform.

For analog neutron, alpha and or beta particle sensors, the analog signals are converted to digital data. Once the neutron, alpha and or beta particle sensor data is digitized, the data is passed to the communications module for digital transmission to the common platform.

For analog explosives sensors, the analog signals are converted to digital data. Once the explosives sensor data is digitized, the data is passed to the communications module for digital transmission to the common platform.

For some sensors, such as gamma detectors, peak detection may be performed locally prior to the data being transmitted to the common platform. This reduces the data transmitted from the sensor to reduce bandwidth requirements.

The ability to collect the data from all of the sensors for analysis enables the integrated I-CBMRNE sensor system to analyze all of the activities at a single location or multiple locations to gain a better understanding of events as they unfold. Tracking of alarm conditions and the integration of a wide variety of alarms also help to gain an understanding of alarm conditions.

By providing a network interface to the I-CBMRNE detectors, a variety of network configurations can be used for delivery of the sensor data. In one application, the sensors could be connected to a network sensor server that allows a multi-user access to the sensor data.

According to an embodiment of the present invention, the integration of CBMRNE sensors across a distributed communications network into a common platform enables a remote monitoring system to be communicatively coupled with the data collection system to remotely monitor the collected signals from the sensor devices and thereby analyze alarm conditions remotely. A user interface provides a graphic presentation of the data from each sensor and/or group of sensors.

Described now is an example of integration of an I-CBMRNE sensors system and the operation of the same according to various embodiments of the present invention.

An exemplary chemical, biological, radiation, nuclear, and explosives detection and identification systems deployed on a common platform, such as illustrated in FIG. 1, provides significantly improved capabilities for data analysis understanding of multiple events associates with an alarm, post processing of the alarm data and databases analysis systems for data mining, statistics, an projections over attempts to deploy individual and separate subsystems of the past.

A data collection system 110, in this example, is communicatively coupled via cabling or other communication link 105 with each of the CBMRNE sensor devices 101, 102, 103, 104. The data collection system includes an information processing system with data communication interfaces that collect signals from the sensor units. The collected signals represent detailed spectral data from each sensor device that has detected CBMRNE materials.

The data collection system 110 is communicatively coupled with a local controller and monitor system 111 and database 122. The local system 112 comprises an information processing system that has a computer, memory, storage, and a user interface 114 such a display on a monitor and a keyboard, or other user input/output device. One of the functions performed by the computer 115 is the spectral analysis to identify the CBMRNE materials. The user interface 114 allows service or supervisory personnel to operate the system and to monitor the status of detection, identification and quantification of CBMRNE materials through the collection of data from sensor units 101, 102, 103, and 104.

The data collection system can also be communicatively coupled with a remote control and monitoring system 118 such as via a network 116. The remote system 118 comprises an information processing system that has a computer, memory, storage, and a user interface 120 such a display on a monitor and a keyboard, or other user input/output device. The network 116 comprises any number of local area networks and/or wide area networks. It can include wired and/or wireless communication networks. This network communication technology is well known in the art. The remote system includes a user interface 120 that allows remotely located service or supervisory personnel to operate the system 112. By operating the system remotely, such as from a central monitoring location, a larger number of sites can be safely monitored by a limited number of supervisory personnel. The sensor units may be deployed in a wide variety of configurations and positions interconnected via wireless or wire-line communications.

Various embodiments of the present invention can be realized in hardware, software, or a combination of hardware and software. A system, according to one or more embodiments of the present invention, can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

An embodiment according to present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The I-CBMRNE system, according to the present example, also provides a modular Sensor Integration Unit 124 (SIU) (see FIG. 1) that enables interchangeable sensor interfaces, such as contained on a daughter board. The sensors enabled, for example, can be chemical, biological, radiation, nuclear and explosives sensors. One example of such an SIU is described in U.S. patent application Ser. No. 11/624,089 filed on Jan. 17, 2007, entitled "System Integration Module For CBRNE Sensors", the entire teachings being incorporated by reference.

According to an embodiment of the present invention, a sensor system and related methods support critical functions required for analog sensors when used in important applications such as material identification. Sensor calibration, automated gain control to elimination analog drift, and automated calibration verification processes are important issues when the sensors are used to provide data to be used in material identification.

Automated Calibration: Background check (or comparison) sources can be used for meaningful calibration of gamma ray scintillation detectors used for capturing data to be used in isotope identification. The hardware calibration is completed and documented for each of the detectors within an array. The software device collecting the spectral data can also perform a secondary calibration to fine-tune the calibration for extreme accuracy.

The following is offered as an example of an automated sensor hardware calibration. Background radiation, such as naturally occurring background radiation, can be used to set the detector preamp gain and to establish the lower discrimination threshold. A processor controls the gain on the sensor devices. The gain is adjusted through a software program to place the radiation detector signal from each detector within a specific calibration tolerance.

Naturally occurring background radiation, or another background source of radiation, can be used as a comparison source for auto calibration of a sensor integration unit 124 and the associated one or more sensors.

Automated Gain Control: A phase-locked loop (PLL) is a closed-loop feedback control system that maintains a generated signal in a fixed phase relationship to a reference signal. An integrated circuit can hold a complete phase-locked loop with signal frequencies from a fraction of a cycle per second up to many gigahertz. The use of the PLL in the circuitry for an analog sensor restricts analog signal drift. The need to have the sensor signal locked into calibration is important for those systems that will use the sensor data to identify specific chemical, biological, radiation, nuclear or explosive materials. The pattern recognition system utilizes spectral signature of known materials to compare to the sensor data. If the sensor data is not calibrated correctly and is not maintained in calibration, the pattern recognition system can be compromised. One or more PLL circuits are therefore preferably used for support of one or more sensors of an I-CBMRNE sensor system.

Automated Calibration Verification: Automated calibration verification, can be performed in through two methods. The first method tests the entire system including the detector. The second method is a partial test that uses predefined sensor output signals to verify the analog circuits supporting the detector.

In another embodiment, an Integrated Chemical, Biological Metals, Radiation, Nuclear, and Explosives sensor system (I-CBMRNE) performs spectral analysis for the identification of targeted materials. The spectral analysis system uses two methods for spectral analysis and comparison to identify the presence of the targeted materials. By using at least two separate identification techniques the I-CBMRNE system offers a multiple confirmation capability for the presence of the targeted materials. These two methods are known as LINSCAN and Margin Setting. Margin Setting is identified in U.S. Pat. No. 6,847,731, and LINSCAN method (a linear analysis of spectra method) is described in U.S. Provisional Patent Application No. 60/759,331, filed on Jan. 17, 2006, by inventor David L. Frank, and entitled "Method For Determination Of Constituents Present From Radiation Spectra And, If Available, Neutron And Alpha Occurrences", the collective entire teachings of which were incorporated by reference into U.S. patent application Ser. No. 11/624,089 filed on Jan. 17, 2007, entitled "System Integration Module For CBRNE Sensors"; and which the collective entire disclosure of all three patent applications being hereby incorporated by reference.

Another embodiment of the invention provides a feature for differentiation between high energy gamma pulse and a neutron pulse at the Sensor Integration Unit 124, the earliest stages of processing. The peak detection firmware within the Sensor Integration Unit 124, according to one example, uses the raw analog detector data to identify energy peaks. During this process the firmware analyzes the peaks to differentiate between a high energy gamma pulse and a neutron pulse. The system identifies the high energy gamma pulse shape during peak detection and either discards the high energy gamma as interference or separates the high energy gamma and neutron counts.

The processor, according to the example, takes an added step to analyze the shape of the pulse to differentiate between actual neutrons detected and interfering signals such as high energy gamma. The detector system uses this method to eliminate false positive detections.

This method described in the previous paragraphs is used for both background data analysis, identification of a neutron event and neutron counting.

The identification of a neutron event may be coupled with gamma spectral analysis for isotope identification.

A process of radiation and detection measurement is described in the publication entitled: IEEE NPSS Short Course, Radiation Detection and Measurement by Helmuth Spieler, Physics Division, Lawrence Berkeley National Laboratory Berkeley, Calif., the teachings of which are hereby incorporated by reference.

A detector configuration would perform tasks 1, 2, and 4, as listed below. Task 3, as listed below, would also be added to a neutron detection process, according to an embodiment of the present invention.

1. Acquire electrical signal from detector typically a short current pulse

2. Tailor the time response (i.e. "shape" the output pulse) of the system to optimize
   minimum detectable signal energy measurement (magnitude of signal)
   event rate time of arrival (timing measurement)
   insensitivity to detector pulse shape
   some combination of the above 3. Optionally, for a neutron detection process, analyze the pulse shape and energy level of the output pulse of the system to differentiate between neutron detection and high gamma energy or interference signals.

4. Digitize the signal and store for subsequent analysis

Figure 2:
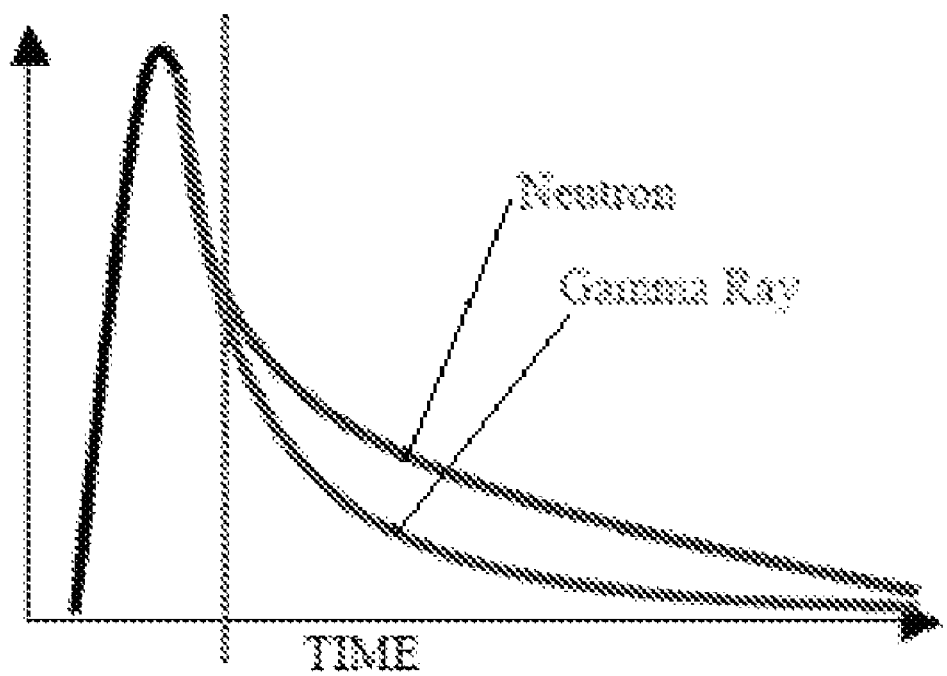
FIG. 2 is a graph illustrating the difference between the gamma and neutron signals.

We have seen where the gamma pulses from the neutron detector have a different shape than the neutron pulses, as illustrated in FIG. 2.

Figure 3:
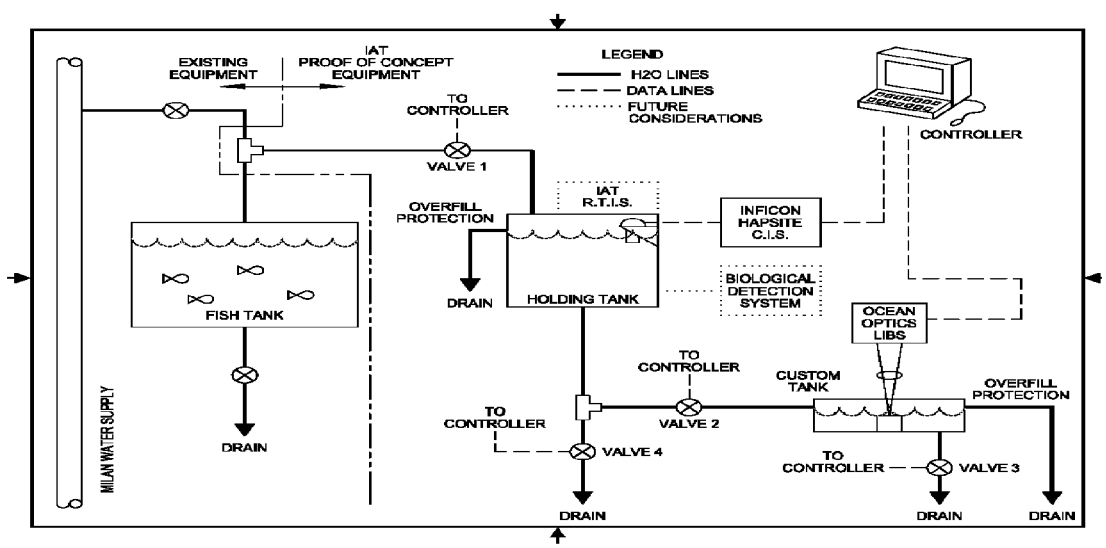
FIG. 3 is a simplified schematic illustrating a Water Analysis System with Sample Delivery for Chemical, Metals and Biological Analysis Process based on a distributed I-CBMRNE architecture.

Illustrated in FIG. 3 is an example of a water analysis system based on a distributed sensor network with a common processing platform for CBMRN devices. The CBMRN devices are based, in this example, on distributed multiple detector technologies such as laser induced breakdown spectroscopy (LIBS), gas chromatography, and calorimetric spectroscopy. This provides significantly improved efficiency and enables real-time, continuous test cycles without manual intervention for a field deployed early warning system for water contamination.

In FIG. 3, water is drawn in-line from the output line of the water distribution system. Typically there is a test line used to draw water for testing or to fill test tanks. The system controls a series of valves as identified in FIG. 3. At the beginning of the test cycle, valves 1, 2 & 3 are opened to flush the system for five minutes. With valves 1 & 2 open and 3 & 4 shut the "Holding Tank" is filled. When the holding tank is full, valve 1, 2 & 4 are shut, isolating the test sample. The Hapsite situ-tube is positioned directly in the holding tank. The system instructs the Hapsite to begin its test cycle.

The system, as shown in FIG. 3, then closes valve 3 to fill the LIBS "Custom Tank". The Custom Tank contains a ceramic plate positioned under the laser. When the water reaches the appropriate height the water is drained from the Custom Tank leaving a small sample on the top of the ceramic plate. The LIBS laser is then fired to detect the presence of heavy metals in the sample located on the top of the ceramic plate. When the LIBS and Hapsite have completed their test cycles they communicate their findings to the local alert notification server. If the local server detects an alert condition it executes the business rules specifically defined for that location. If the samples are in acceptable limits such that no alert condition occurs then valve 4 is opened to drain the Holding Tank. In either case the local server communicates the result of the test to the central Alert Notification server with a time-stamped record of the test, the results, and actions taken.

According to various embodiments of the present invention, any portion of or the entire processing and analysis of sensor and/or detector data can be accomplished on-site, such as by an on-site information processing system, or transmitted to a remote information processing system for remote processing and analysis of sensor and/or detector data. An interface to a manifest, communicatively coupled with the one or more information processing systems, could be used to look-up manifest information and compare the findings to determine if there are hazardous materials concealed within packages or containers.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An integrated chemical, biological, metals, radiation, nuclear, and explosives (CBMRNE) materials detection and identification system, comprising one or more of the following types:
   a plurality of sensors, comprising one or more of the following types:
      chemical detection sensors,
      chemical identification sensors,
      biological detection sensors,
      biological identification sensors,
      radiation detection sensors,
      radiation identification sensors,
      nuclear detection sensors,
      nuclear identification sensors,
      explosives detection sensors, and
      explosives identification sensors;
   a digital data collection system and communications system, communicatively coupled with the plurality of detection and identification sensors, for transfer of collected radiation data to an analysis system; and
   a spectral analysis system, communicatively coupled with the digital data collection system and communications system, to analyze sensor data provided by the plurality of sensors to identify the specific, chemical and biological materials or isotopes present; and
   an information processing system, communicatively coupled with the spectral analysis system, that analyzes the chemical, biological, explosives, or isotopes found to identify if the materials are hazardous and the possible materials or goods that they represent;
   a centralized database for analysis of event data, statistics, patterns, forensic analysis and projections; wherein the spectral analysis system further for, when the plurality of sensors includes a radiation or nuclear sensor, differentiating between gamma pulses and neutron pulses, by: receiving a signal from an output of a neutron detector; analyzing a pulse shape of the signal, differentiating the pulse shape between gamma pulses and neutron pulses; and determining that the pulse shape of the signal is one of a gamma pulse and a neutron pulse; and further wherein a sensor integration unit is deployed as a network edge device to allow sensor connection from the plurality of sensors to a communication network, the sensor integration unit further for using background radiation as a comparison source for auto calibration of the sensor integration unit when being communicatively coupled with one or more radiation sensors.

2. The system of claim 1, wherein a sensor integration unit is deployed as a network edge device to allow sensor connection from the plurality of sensors to a communication network.

3. The system of claim 1, further comprising an interface to a manifest, communicatively coupled with the information processing system, to compare the findings to determine if there are hazardous materials concealed within packages or containers.

4. The system of claim 1, including a sensor integration unit for communicatively coupling the digital data collection system and communications system with one or more of the plurality of sensors.

5. The system of claim 4, wherein the sensor integration unit provides automated calibration, automated gain control, and automated calibration verification support functions for the one or more of the plurality of sensors.

6. The system of claim 1, further comprising means for detection, identification, and quantification of metals, chemicals, and biological materials within a water sample, the means being comprised of:
   a laser induced breakdown spectrometry (LIBS) sensor;
   a water sample delivery device using a raised platform in a water container where the water sample is introduced into the water container at a water level above the platform and then lowered to provide a water sample residue on the platform for LIBS analysis;
   a means for cleaning the water sample platform by raising the water level in the water container and flushing the sample from the platform, and;
   a signal processor and central processor for analyzing the LIBS sensor data corresponding to the water sample and providing associated LIBS digital data;
   a communications device, communicatively coupled with the signal processor and central processor, to couple the LIBS digital data to a communications network;
   an individual TCP/IP address associated with the LIBS sensor on the communications network; and
   a remote monitoring facility, communicatively coupled with the communications network, to further analyze LIBS data from the LIBS sensor on the communications network to produce alarms, and response protocols.

* * * * *